United States Patent [19]

DeWick, Sr. et al.

[11] Patent Number: 4,858,170

[45] Date of Patent: Aug. 15, 1989

[54] SHORTHAND NOTATION AND TRANSCRIBING METHOD

[76] Inventors: Robert S. DeWick, Sr.; Carolyn C. DeWick, both of 118 Everett Rd., Knoxville, Tenn. 37922

[21] Appl. No.: 923,006

[22] Filed: Oct. 24, 1986

[51] Int. Cl.⁴ .............................................. G06F 9/00
[52] U.S. Cl. .................................................. 364/900
[58] Field of Search ...................... 364/200, 900, 300; 178/21,.2 R

[56] References Cited

U.S. PATENT DOCUMENTS

| | | | |
|---|---|---|---|
| 3,892,915 | 7/1975 | Budworth et al. | 364/900 |
| 4,041,467 | 8/1977 | Loth et al. | 364/900 |
| 4,566,065 | 1/1986 | Toth | 364/300 |
| 4,724,285 | 2/1988 | Lefler et al. | 178/2 R |

Primary Examiner—Thomas M. Heckler
Assistant Examiner—John G. Mills
Attorney, Agent, or Firm—Pitts and Brittian

[57] ABSTRACT

An improved shorthand notation and transcribing method for recording vocalized speech and transcribing such shorthand notation into conventional language text is disclosed. The method utilizes a conventional computer (10) for processing and storing shorthand data, the computer (10) being provided with a conventional keyboard (12) and a suitable output device, such as a printer (14), for printing the transcribed text. The method of the present invention generally comprises translating the vocalized speech into the improved shorthand of the present invention and inputting such shorthand data via the computer keyboard (12). Using software (16) provided to implement the method of the present invention, the shorthand data is then edited thereby creating a Shorthand File (24) stored on magnetic media. The Shorthand File (24) is then submitted to a Translate Program (20) which separates the file (24) into separate shorthand words whereupon the shorthand words are used to locate matched pairs of shorthand and conventional language words stored in one or more libraries thereby translating the shorthand words. Provision is also made for receiving operator input of matched pairs where a matched pair has not been located in one of the libraries. A Build Document Routine (38) then creates a Document File (26) comprising translated text. The Document File (26) is thereupon formatted by a Format Program (22) and output to the printer (14) for printing. Also disclosed is the improved method of the present invention for translating the vocalized speech into the improved shorthand notation of the present method.

10 Claims, 4 Drawing Sheets

SHORTHAND NOTATION AND TRANSCRIBING METHOD

TECHNICAL FIELD

This invention relates to an improved shorthand notation method designed to be input to a conventional computer via a conventional computer keyboard for recording vocalized speech and an associated transcribing method for retranslating such shorthand notation and displaying such retranslated text on the CRT screen of the computer and/or printing such text on a suitable output device.

BACKGROUND ART

Various shorthand notation methods have been devised for recording, or as it is known in the art, reporting, spoken language as it is vocalized. Such methods include Gregg shorthand, whereby the shorthand writer writes with a pen or pencil and records on a notepad, after which the writer's notes must be transcribed into typewritten form. Generally the Gregg shorthand writer either types or transcribes from his notes, engages a note reader to decipher his notes and transcribe them into typewritten form for him, or he dictates his shorthand notes onto a cassette tape and a typist transcribes on a typewriter or word processor. It will be appreciated that great skill and speed are required to accurately record verbatim speech using a handwritten shorthand form, and, whichever transcribing method is used, a great deal of time and effort is required to produce an accurate typed transcript.

The stenograph system is another popular notation method. The stenograph system allows the stenographer to record his notes on a stenograph machine, the stenograph machine having a specially designed keyboard for rapidly inputting shorthand notation. Whereas the stenograph machine has provided a means for more efficiently recording verbatim speech, the job of transcribing the shorthand notes still remains. In this regard, a few attempts have been made to reduce the labor involved in transcribing by using computers to aid in the production of transcripts. For example, U.S. Pat. No. 3,558,820, issued on Jan. 26, 1971; U.S. Pat. No. 3,665,115, issued on May 23, 1972; and U.S. Pat. No. 4,041,467, issued on Aug. 9, 1977, all disclose attempts to produce computer-aided transcript. However, heretofore, all such methods have required a stenograph machine modified to facilitate computer input. Thus, if the methods are to be practiced, specialized equipment must be obtained and a specialized input device must be learned. Resultantly, for all practical purposes, use of such methods is feasible only where the user is a professional shorthand reporter.

Accordingly, it is an object of the present invention to provide an improved shorthand notation and transcribing method for recording verbatim speech and automatically transcribing the resulting shorthand notes into conventional language text.

It is another object of the present invention to provide an improved shorthand notation and transcribing method utilizing a conventional computer keyboard as an input device, thus obviating the need for a stenograph machine or other specialized input device.

It is yet another object of the present invention to provide an improved shorthand notation and transcribing method which is easy to learn and inexpensive to use.

DISCLOSURE OF THE INVENTION

Other objects and advantages will be accomplished by the present invention which provides an improved shorthand notation and transcribing method for recording vocalized speech and transcribing such shorthand notation into conventional language text. The method utilizes a conventional computer for processing and storing shorthand data, the computer being provided with a conventional computer keyboard and a suitable output device, such as a printer, for printing the transcribed text. The method of the present invention generally comprises translating the vocalized speech into the improved shorthand of the present invention and inputting such shorthand data on the computer keyboard. Using computer software to implement the method of the present invention, the shorthand data is then edited thereby creating a shorthand file stored on magnetic media. The shorthand file is then submitted to a translate program which separates the file into separate shorthand words, whereupon the shorthand words are used to locate matched pairs of shorthand and conventional language words or phrases stored in one or more libraries, thereby translating the shorthand words. Provision is also made for prompting and receiving operator input comprising such matching pairs where a matched pair has not been located in one of the libraries. A Build Document Routine then creates a Document File, comprising translated text which is saved on magnetic media. The Document File is thereupon formatted by format program and output to the output device for printing.

BRIEF DESCRIPTION OF THE DRAWINGS

The above-mentioned method of the present invention will become more clearly understood from the following detail description of the invention read together with the drawings in which.

BEST MODE FOR CARRYING OUT THE INVENTION

Figure 1:
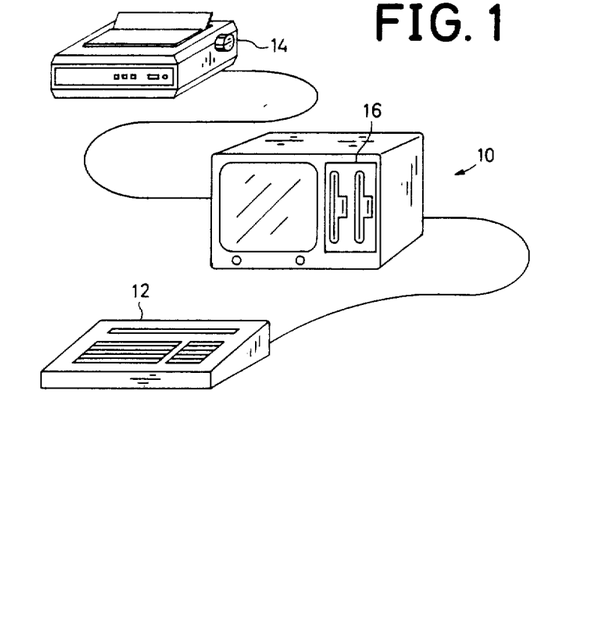
FIG. 1 illustrates a computer and an associated keyboard, and an output device suitable for being utilized in the application of the method of the present invention.

The present invention comprises an improved shorthand notation and transcribing method for recording, or reporting, verbatim speech as it is vocalized and for automatically transcribing such recorded speech into conventional printed text. As illustrated in FIG. 1, the method of the present invention utilizes a conventional computer 10 having a standard computer keyboard 12 as an input device, and a suitable output device, such as the illustrated printer 14. As will be discussed in detail below, the computer 10 is provided with processing means comprising the computer software of the present invention, referenced at 16 in the figures, for editing, transcribing and otherwise processing the shorthand data input on the keyboard 12.

For the purposes of this application, the method of the present invention will be discussed with regard to recording and transcribing in the English language. However, it will be appreciated that the method of the present invention is adaptable to various languages. Further, throughout the discussion that follows, reference will be made to shorthand words or notes, and for convenience, the English translation of such shorthand words or notes will follow in parentheses.

Figure 2:
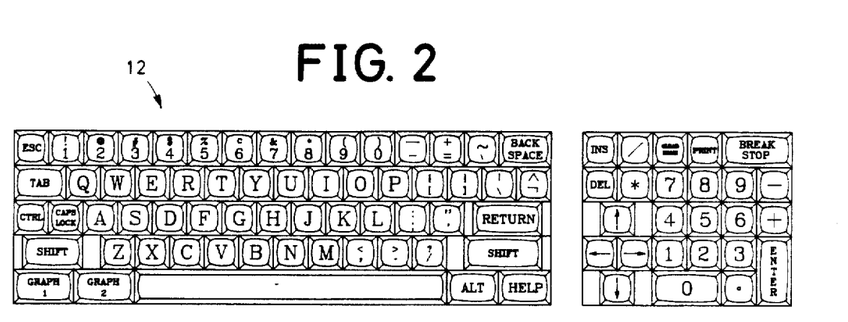
FIG. 2 illustrates a conventional keyboard suitable for inputting the improved shorthand notation of the present invention.

As indicated above, the shorthand notation of the present invention is designed to be input on a conventional computer keyboard 12, which, as illustrated in FIG. 2, comprises a plurality of keys selectively positioned in essentially the same format as that of a conventional typewriter keyboard. Further, the keyboard fingering utilized is substantially the same as that utilized on a typewriter keyboard, with the same "home row" finger positioning being desirable. Thus, most persons seeking to learn the method of the present invention will, to some extent, be familiar with the input device utilized, and will not be confronted with a totally foreign mechanical device requiring totally foreign fingering techniques.

In general, the shorthand notation of the present method comprises a phonetic code derived through the application of certain general rules which operate to reduce English words and phrases to their phonetic equivalents, or which otherwise reduce the input time required to record the vocalized English speech. For example, the shorthand notation for the English word "staff" is "staf", and the English word "half" becomes "haf". Accordingly, in the foregoing examples, input time is reduced by decreasing the number of characters which must be input. These general rules comprise the following:

1. Silent letters which appear in an English word are dropped. For example, the English "honest" becomes "ones" in shorthand form.

2. When two of the same consonants are consecutive within a word, one is dropped. Thus, the English word "narrow" is written as "naro".

3. Where only one vowel occurs in a word, the shorthand word is spelled in the same manner as the English word, as in the case of the English words "tug" and "sin".

4. When two of the same vowels appear consecutively in a word, one of the vowels is dropped. Accordingly, the English word "free" becomes "fre" and "bookkeeper" is written as "bokepr".

5. Unaccented vowels are eliminated. For example, the letters "i" in the English word "malicious" are dropped such that the shorthand word becomes "malshs", the unaccented vowels being unnecessary to achieve a phonetic equivalent.

6. All long vowels are written if sounded. For example, the English word "sign" is written as "sine", thus, establishing a long vowel sound for the letter "i" and avoiding a conflict with the shorthand word "sin" (sin).

7. In word 5 having more than one syllable, "la" and "ta" are dropped. Thus, the English word "tabulation" is represented by the shorthand "tabgs", the "la" being dropped as an extraneous syllable. It will also be noted that the "u" is dropped as an unaccented vowel, and as discussed below, the suffix "tion" is represented by the "gs".

8. The letter "d" appearing after the letter "n" is dropped if it occurs in the same syllable. For example, "hand" becomes "han" in the shorthand of the present method, but "handle" is written as "handl".

9. In the shorthand of the present method, the letter "y" is used whenever the "y" sound is heard. Thus, "union" becomes "unyon" and "stereo" is written as "steryo".

10. When a "t" occurs after the letters "s" or "x", the "t" is dropped. Accordingly, "firsthand" is written as "firshan" and "textbook" is written as "texbok".

11. Whenever the letter combination "ct" appears, the "ct" is replaced with "k". For example, the English word "action" is written as "akgs" and "fact" is written "fak".

12. One space is left after punctuation, in general, and a slash (/) is used in place of a question mark such that it is not necessary to depress a shift key.

13. Capitalization is omitted except where required to differentiate two similarly spelled shorthand words. Thus, no initial capital letter is used on the first word following a period or colon, and the letter "i" is written in lower case when used as a noun. Further, initial capitals need not be used on common forms of address such as "mr" (Mr.) and "dr" (Dr.).

14. Conventional abbreviations are used to indicate the days of the week, months of the year, measurements, etc. For example, "Tuesday" is written "tue", "February" is written "feb", and "yards" is written "yds".

Notwithstanding the above-referenced general rules, words which are frequently used are shortened into brief forms, and, since these words are not necessarily phonetic equivalents of the associated English word, such forms must be memorized by the user. For the purposes of this application, these shorthand forms will be referred to as arbitraries. A few examples of such arbitraries are "au" (automobile), "veh" (vehicle), and "fg" (photograph). Similarly, certain combinations of words, and commonly encountered phrases, are also represented by brief forms which are memorized by the user. For example, "Ladies and Gentlemen of the Jury" is written "ljj", and "in other words" is shortened to the brief form "nows". Other examples are "ntthos" (into the hospital) and "sam" (as a matter of fact). Provision is also made for changing the tense of a shorthand word, thus "au" (automobile) becomes "aus" (automobiles) and "fg" (photograph) becomes "fgd" (photographed). Also, commonly encountered English prefixes and suffixes are given shorthand forms which further reduce the input on the keyboard. Examples of such prefixes and suffixes are collected in Tables 1 through 4 below.

It will be appreciated that various words in the English language sound alike, but have different meanings. Accordingly, provision is made for altering the spelling of certain shorthand forms such that the proper meaning is conveyed. For example, the English word "sighs" and "size" must be differentiated in their shorthand forms to convey the proper meaning. Designated shorthand spellings are assigned such that "sighs" is represented by the shorthand form "sis" and "size" is translated into the shorthand form "siz". Further, in certain circumstances, where two shorthand words are spelled alike, such words are differentiated to convey the appropriate meaning by capitalizing the first letter of one shorthand word while the first letter of the other remains in the lower case. For example, the letter "x" is used to represent both the English words "examine"

and "x-ray". Therefore, such that the proper meaning will be conveyed, "examine" is represented by a lower case "x" and "x-ray" is represented by the capital letter "X".

It will be appreciated that the shorthand method of the present invention serves to reduce input time by reducing the number of characters which must be input on the keyboard 12. Additionally, however, the shorthand system utilizes preselected stroking techniques for efficiently inputting such characters on the keyboard 12. A computer keyboard differs from a conventional typewriter keyboard in that on a computer keyboard a plurality of keys may be depressed simultaneously with the result being the input of each of the characters or functions associated with the keys struck being input in a sequence determined by its location on the keyboard 12. In this regard, the standard computer 10 scans input on the keyboard from left to right such that where more than one key is stroked simultaneously, the key located furthest to the left on the keyboard will input first with the other keys being input in sequence from left to right. Thus, if the letters "s", "t", and "k" are struck simultaneously, the computer will scan the input as "stk" (is that correct).

The shorthand of the present invention utilizes this capability of simultaneously striking a plurality of keys for a desired sequential input by using simultaneous, or near simultaneous, key stroke techniques. For example, the shorthand word "stk" (is that correct) of the present shorthand method can be input by striking the "s" key, the "t" key, and the "k" key simultaneously as indicated above, thereby inputting the shorthand word in one stroke rather than by striking three separate keys. Other examples of shorthand words of the method of the present invention which may be input in a single stroke are set forth in Tables 5 and 6 below. Further, it will be appreciated that even where a shorthand word cannot be input in a single stroke, the number of strokes necessary can be reduced significantly by the simultaneous depressing of keys. For examples of shorthand words requiring two or more strokes to input, see Table 6. Also, for additional examples of shorthand notes and the associated English translation, see Table 7.

It should be noted at this point that even where the desired input may be accomplished with a simultaneous key stroke involving more than one key, in some cases it is desirable to strike the keys from left to right in a near simultaneous roll rather than simultaneously in order to preserve the user's typing rhythm. However, for purposes of this discussion, such a near simultaneous roll technique shall be deemed one stroke. Thus it will be appreciated that the shorthand notation of the present method greatly reduces the number of characters which are required to be input on the keyboard, and, further, decreases input time by providing for simultaneous or near simultaneous stroking techniques, pursuant to which many words can be input in one stroke, rather than inputting each character of the word individually.

As indicated above, once the shorthand of the present method is input to the computer 10 with the keyboard 12, the software 16 which implements the present method processes the shorthand notes and translates the notes into English text when desired. In this regard, a flow diagram illustrative of the functions performed by the software is provided in FIG. 3. As illustrated, the software 16 comprises an edit program 18, a translate program 20, and a format program 22. The edit program 18 comprises a text editor which edits the shorthand notes which are input and saves the notes on magnetic media. Thus, as diagrammed in FIG. 3, the edit program 18 takes the shorthand input on the keyboard 12 and creates a shorthand record which is stored in the shorthand file 24. The shorthand file 24 comprises the untranslated shorthand notes and may be accessed using the computer 10 and displayed on the computer CRT screen 11, or may be printed in its untranslated form if desired. When translation is desired, the shorthand record compiled by the edit program 18 and stored in the shorthand file 24 is input to the translate program 20 by an appropriate computer command which translates the shorthand record into a document record comprising the English text and stores the document record in a document file 26. The format program 20 has as its input the document record (translated text) stored in the document file 26 and serves to format the English text into the appropriate form for the job being transcribed; i.e., a deposition, minutes of a meeting, a trial transcript, a business letter, etc., and outputs it to the printer 14.

Figure 4:
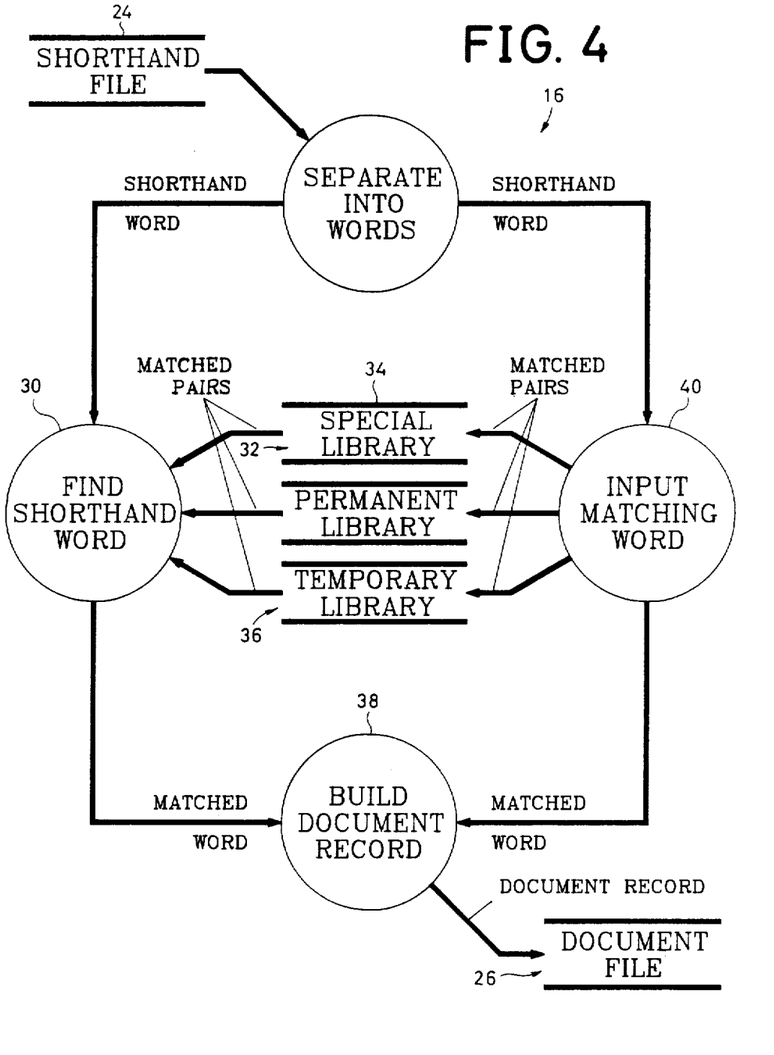
FIG. 4 is a data flow diagram illustrative of the translation routines of the method of the present invention.

In FIG. 4, a data flow diagram is provided illustrating the translation routines performed by the translate program 20. The first routine performed is word separation illustrated at 28. The Word Separation Routine 28 parses the shorthand record input from the shorthand file 24 and outputs the separated shorthand words for processing by the Find Shorthand Word Routine illustrated at 30 in FIG. 4. The Find Shorthand Word Routine 30 searches a plurality of libraries, including a permanent library 32, one or more special libraries 34, and a temporary library 36, to match each shorthand word with the English equivalent. If the English equivalent for the shorthand word is found, the English translation, or matched word, is output to the Build Document Routine 38, which builds a record of the English translation and stores the English translation on magnetic media, thus creating the Document File 26.

If the Find shorthand Word Routine 30 fails to locate the English equivalent for a shorthand word, such word is submitted for processing by the Matching Word Routine 40. The routine 40 prompts the operator to input the English word or text corresponding to the shorthand word for which a match was not found. When the English translation has been input by the operator, the Matching Word Routine 40 outputs the English translation; i.e., the matched word, to the Build Document Routine 38 which incorporates the matched word into the document file 26. The Matching Word Routine 40 also prompts the operator to submit the matched pair, the shorthand word and its English equivalent, to one of the libraries 32, 34 or 36, such that when, or if, the shorthand word is encountered again, the English translation will be available in one of the libraries.

Each of the libraries 32, 34, and 36, serves a different function. The permanent library 32 comprises matched pairs of general vocabulary, or text encountered in everyday speech. The special libraries 34, on the other hand, comprise matched pairs relating to a particular field such as medicine, engineering, architecture, etc. Thus, for example, where a medical deposition is being reported, a special library 34 of medical terms can be used in conjunction with the permanent library 32. The temporary library 36 comprises matched pairs which have been generated by the Matching Word Routine 40, but which the operator does not wish to save other than for the translation of the specific text currently being worked on. Thus, for example, where the operator was using a certain shorthand word for the name of a person which appears throughout the text or piece of work, but is not otherwise frequently encountered, the operator may wish to store the matched pair generated by the Matching Word Routine 40 in the temporary library 36 such that when the shorthand form is encountered again in the translation of that particular piece of work, the matched pair is found by the Find Shorthand Word Routine 30. However, the temporary library 36 is retained only for the purposes of the particular shorthand file being worked on and thus the available computer memory is not wasted by the permanent retention of these infrequently encountered matched pairs.

Figure 5:
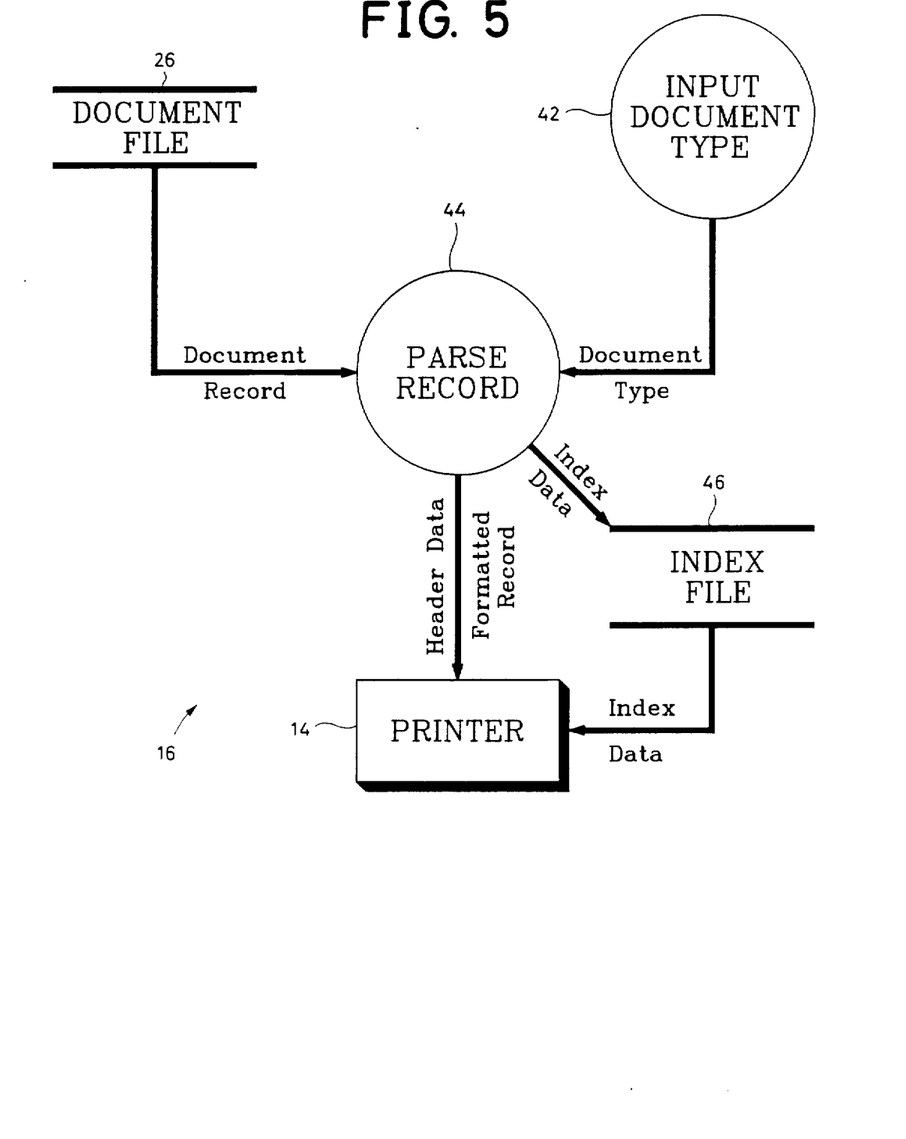
FIG. 5 is a data flow diagram of the format routines of the method of the present invention.

A data flow diagram of the format program 22 is illustrated in FIG. 5. As discussed above, the format program formats the English text into the desired form for printing, and comprises an Input Document Type Routine 42 and a Parse Record Routine 44. The Input Document Type Routine 42 takes operator input defining the type of document that is to be printed; i.e., whether it is a deposition, court transcript, minutes, etc., and furnishes such operator input to the Parse Record Routine 44. Based upon the document type, the Parse Record Routine 44 supplies the appropriate page header, splits the document record into parts that will fit between the margins of the paper, prefixes the lines with line numbers where the document type requires, and otherwise creates the appropriate formatted record which is output to the printer 14 for printing. The Parse Record Routine 44 also allows the operator to input index data such as attorneys' names, witnesses' names, examination type, and page numbers, if desired, all of which is stored in the index file 46 and output to the printer 14 when the document is printed.

In light of the above, the advantages of the shorthand notation and transcribing method of the present invention are clear. The method requires no specially designed stenographic equipment, but, instead, utilizes a conventional computer having a conventional keyboard. Because a conventional keyboard is used, most operators will be familiar with the keyboard format and the fingering desirable to input the shorthand of the present invention. Thus, no new specially devised keyboard need be learned, as in the case of learning to use a stenographic machine. It should also be noted that certain computer keyboards presently available allow any key on the keyboard to be assigned a letter of the alphabet. Therefore, where such a keyboard is used in connection with the present invention, the keyboard can be modified to look and act similar to a stenograph machine, thereby allowing current stenograph writers to use the present invention with minimal training and adjustment.

Figure 3:
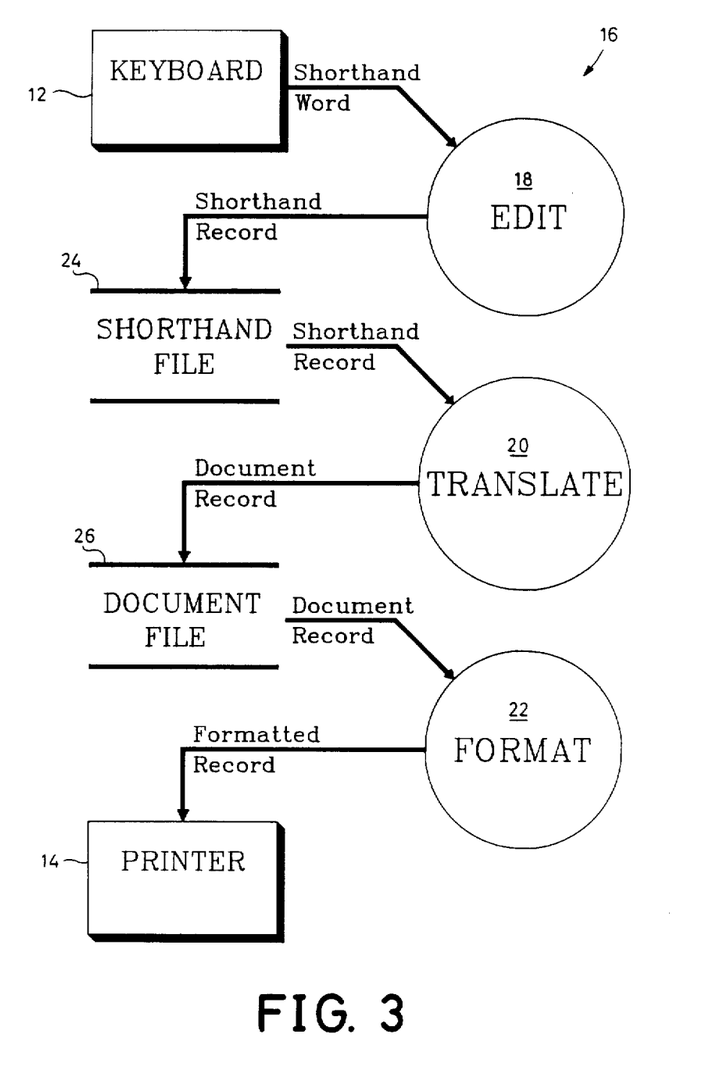
FIG. 3 is a data flow diagram illustrative of the data processing steps performed in the application of the method of the present invention.

It should be noted at this point that the shorthand of the present invention can be useful even in the absence of the automatic translation features of the present method since no specialized input device is required. However, it will be appreciated that the automatic translation provided by the present method greatly reduces the user's labor in generating translated text. Accordingly, instead of laboriously reading and manually transcribing from shorthand notes, the operator need only supply the occasional English translation where the Find Shorthand Word Routine 30 has failed to find a matched pair in one of the libraries provided and input the computer commands necessary to initiate the various processing routines. Still further, with the time necessary to translate being greatly reduced, transcripts can be provided at less expense. Further, the computer CRT screen provides ready access to both the untranslated shorthand file 24 and the document file 26, whether or not a hard copy printout is desired.

While a preferred embodiment has been shown and described, it will be understood that there is no intent to limit the invention to such disclosure, but rather it is intended to cover all modifications and alternate constructions falling within the spirit and scope of the invention as defined in the appended claims.

TABLE 1
ONE-STROKE PREFIXES

| ak | represents | "act" | akgs | (action) |
|----|-----------|-------|------|----------|
| b | represents | "be" | bhavrsm | (behaviorism) |
| e | represents | "enter" | etain | (entertain) |
| i | represents | "inter" | irogtri | (interrogatory) |
| j | represents | "ch" | jerj | (church) |
| k | represents | "col" | kektr | (collector) |
| k | represents | "com" | kpilgs | (compilation) |
| k | represents | "con" | ktrol | (control) |
| m | represents | "im" | mpresv | (impressive) |
| m | represents | "em" | mbolsm | (embolism) |
| m | represents | "man" | mmt | (management) |
| n | represents | "non" | nseqtr | (non sequitur) |
| n | represents | "en" | nabl | (enable) |
| n | represents | "in" | nvolvmt | (involvement) |
| p | represents | "pro" | psedr | (procedure) |
| ru | represents | "rheu" | rumatsm | (rheumatism) |
| s | represents | "some" | sh | (somehow) |
| s | represents | "step" | smoer | (stepmother) |
| s | represents | "self" | sservg | (self-serving) |
| s | represents | "sub" | strakgs | (subtraction) |
| s | represents | "super" | sfish | (superficial) |
| si | represents | "psy" | sikolge | (psychology) |
| t | represents | "tele" | tfon | (telephone) |
| t | represents | "trans" | tlags | (translation) |
| x | represents | "ex" | xsiz | (exercise) |

TABLE 2
TWO-STROKE PREFIXES

| dok | represents | "doc" | dokmtri | (documentary) |
|-----|-----------|-------|---------|---------------|
| ds | represents | "ds" | dsblt | (disability) |
| fis | represents | "phys" | fislge | (physiology) |
| sta | represents | "sta" | stabz | (stabilize) |

TABLE 3
ONE-STROKE SUFFIXES

| b | represents | "body" | sb | (somebody) |
|---|-----------|--------|-----|------------|
| bl | represents | "able" | pardnbl | (pardonable) |
| bl | represents | "ible" | flexbl | (flexible) |
| f | represents | "ful" | ronf | (wrongful) |
| g | represents | "ing" | xg | (examining) |
| g | represents | "thing" | sg | (something) |
| h | represents | "how" | sh | (somehow) |
| j | represents | "age" | rekj | (wreckage) |
| j | represents | "ch" | jerj | (church) |
| k | represents | "ic" | medk | (medic) |
| l | represents | "ly" | faerl | (fatherly) |
| kl | represents | "ical" | medkl | (medical) |
| m | represents | "most" | srnm | (southernmost) |
| ri | represents | "ary" | dokmtri | (documentary) |
| ri | represents | "ory" | nrogtri | (interrogatory) |
| s | represents | "ship" | partnrs | (partnership) |
| sf | represents | "self" | ursf | (yourself) |
| sh | represents | "cial" | benfish | (beneficial) |
| sh | represents | "tial" | nsh | (initial) |
| sm | represents | "ism" | rumatsm | (rheumatism) |
| sm | represents | "some" | boersm | (bothersome) |
| t | represents | "te" | ksumat | (consummate) |
| t | represents | "ity" | nsant | (insanity) |
| v | represents | "ive" | mpresv | (impressive) |
| z | represents | "ize" | stabz | (stabilize) |

TABLE 4
TWO-STROKE SUFFIXES

| blt | represents | "bility" | sponblt | (responsibility) |
|-----|------------|----------|---------|------------------|
| ge  | represents | "ogy"    | fislge  | (physiology)     |
| gs  | represents | "ation"  | xgs     | (examination)    |
| gs  | represents | "tion"   | akgs    | (action)         |
| gs  | represents | "sion"   | xtengs  | (extension)      |
| mt  | represents | "ment"   | mmt     | (management)     |
| shs | represents | "cious"  | malshs  | (malicious)      |

TABLE 5
EXAMPLES OF KEYS THAT CAN BE STROKED SIMULTANEOUSLY

| stk | (is that correct) |
|-----|-------------------|
| wer | (we are)          |
| as  | (as)              |
| st  | (state)           |
| ST  | (street)          |
| bp  | (burden of proof) |
| top | (top)             |
| op  | (opinion)         |
| uk  | (you can)         |
| ul  | (you will)        |
| wup | (will you please) |

TABLE 6
EXAMPLES OF TWO OR MORE KEYS IN MORE THAN ONE STROKE, DEPENDING ON KEYBOARD LOCATION

| de    | (defendant) | two strokes   |
|-------|-------------|---------------|
| mj    | (emergency) | two strokes   |
| xuv   | (executive) | three strokes |
| stmt  | (statement) | three strokes |
| dsblt | (disability)| three strokes |

TABLE 7
SAMPLE NOTES AND TRANSLATION

NOTES:

duvkags to pskrib ni pain medgs for her durg t kors f ur trmt f her/

TRANSLATION:

Did you have occasion to prescribe any pain medication for her during the course of your treatment of her?

NOTES:

wheu xd her othada, wwt natur f ur xgs/

TRANSLATION:

When you examined her on that day, what was the nature of your examination?

NOTES:

i felt shed a 10p ppfm ft bodhol. shed a ssprain ra nek sprain wi agvated her pxg kn.

TRANSLATION:

I felt she had a 10 percent permanent partial physical impairment of the body as a whole. She had a cervical sprain or a neck sprain which aggravated her preexisting condition.

NOTES:

dou solmnl sware that tm ur b to giv lbt trut, t hol trut an nog but trut, so hep u God/

TRANSLATION:

Do you solemnly swear that the testimony you are about to give will be the truth, the whole truth and nothing but the truth, so help you God?

We claim:

1. An improved method for recording vocalized speech comprising spoken words and transcribing said speech into commonly readable text, said method utilizing a programmable data processing system having an inputting keyboard, a central processing unit and an output device for producing printed text, said method comprising the steps of:

assigning selected alphabetic shorthand notations for individual and groups of said spoken words;

inputting said shorthand notations into said central processing unit using said keyboard;

selectively editing said input shorthand notations using said keyboard and a preprogammed text editing routine stored in said central processing unit, whereby corrections and alterations to said shorthand notations can be input into said central processing unit;

recording said selectively edited shorthand notations input to said central processing unit on magnetic media in said central processing unit whereby a shorthand file is created;

separating said shorthand file into individual shorthand words using a preprogrammed separate word routine in said central processing unit;

matching said separated individual shorthand words with matched pairs of said shorthand words and words of said commonly readable text stored on magnetic media in a first library in said central processing unit using a preprogrammed find shorthand word routine in said central processing unit, whereby said commonly readable text translations of said separated individual shorthand words are identified;

assembling said words of commonly readable text identified by said find shorthand word routine into a translated document file using a preprogrammed build document routine in said central processing unit; and selectively arranging said words of said document file using a preprogrammed formatting routine in said central processing unit to produce a formatted record suitable for being printed by said output device.

2. The improved recording and transcribing method of claim, 1, and before the step of assembling said words of commonly readable text, wherein said method further comprises the step of inputting into said central processing unit, using said keyboard, a matching word of commonly readable text for each said shorthand word for which no said matching pair is stored in said library using a preprogrammed input matching word routine in said central processing unit, whereby translations of shorthand words not identified by said step of matching said separated individual shorthand words are identified.

3. The improved recording and transcribing method of claim 1 wherein said first library comprises a plurality of said matched pairs permanently stored on magnetic media, and wherein said find shorthand word routine utilizes a second library of selectively inputted matched pairs temporarily stored on magnetic media, and at least one special library comprising a plurality of matched pairs relating to a particular vocation or technical field stored on magnetic media.

4. The improved recording and transcribing method of claim 2 wherein said input matching word routine stores in said first library matched pairs comprising said shorthand word not identified by said find shorthand word routine and said matching word of commonly readable text associated therewith and identified through input on said keyboard, whereby said find shorthand word routine will identify translations of said shorthand word upon subsequent input.

5. The improved method for recording and transcribing of claim 1 wherein said shorthand notation input to said central processing unit is derived by:
- omitting all silent letters appearing in each said spoken word;
- omitting a consonant where two of the same said consonants appear consecutively in the same said spoken word;
- omitting a vowel where two of the same said vowels appear consecutively in the same said spoken word;
- omitting all unaccented vowels from each said spoken word;
- omitting the letter combinations "la" and "ta" in each said spoken word where said spoken word had more than one syllable; omitting the letter "d" in each said spoken word where said letter "d" appears after the letter "n" and occurs in the same syllable;
- writing the letter "y" in each said spoken word wherever the "y" sound is heard;
- omitting the letter "t" in each said spoken word where said letter "t" occurs after the letter "s";
- omitting the letter "t" in each said spoken word where said letter "t" occurs after the letter "x";
- replacing the letter combination "ct" with the letter "k" in each said spoken word where said letter combination "ct" occurs; and
- omitting all but one space after punctuation when inputting said improved shorthand notation via said keyboard.

6. The improved method for recording and transcribing of claim 5 wherein further preselected spoken words and phrases are assigned non-phonetic, alphabetic shorthand words.

7. A method for rapidly recording vocalized speech comprising spoken words and transcribing said spoken words into commonly readable, text comprising the steps of:
- assigned an alphabetic shorthand code to said spoken words, said code being derived by
  a. omitting all silent letters appearing in each said spoken word of said vocalized speech;
  b. omitting a consonant where two of the same said consonants appear consecutively in the same said spoken word;
  c. omitting a vowel where two of the same said vowels appear consecutively in the same said spoken word;
  d. omitting all unaccented vowels from each said spoken word;
  e. omitting the letter combinations "la" and "ta" in each said spoken word where said spoken word has more than one syllable;
  f. omitting the letter "d" in each said spoken word where said letter "d" appears after the letter "n" and occurs in the same syllable;
  g. writing the letter "y" in each said spoken word wherever the "y" sound is heard;
  h. omitting the letters "t" in each said spoken word where said letter "t" occurs after the letter "s";
  i. omitting the letter "t" in each said spoken word where said letter "t" occurs after the letter "x";
  j. replacing the letter combination "ct" with the letter "k" in each said spoken word where said letter combination "ct" occurs; and
- entering into an appropriately programmed data processing system said alphabetic shorthand code to produced said spoken words in typed or printed form.

8. The method for recording and transcribing of claim 7 wherein preselected frequently used spoken words and phrases are assigned non-phonetic, alphabetic shorthand code words.

9. The method for recording and transcribing of claim 7 wherein all said spoken words defining days of the week, months of the year, and measurements are replaced with abbreviations utilized in commonly readable text.

10. The method for recording and transcribing of claim 7 wherein commonly repeated prefixes and suffixes of said vocalized speech are replaced with alphabetic shorthand codes.

* * * * *